(12) United States Patent
Goutal et al.

(10) Patent No.: US 12,542,814 B2
(45) Date of Patent: Feb. 3, 2026

(54) DETECTION OF BARCODE URL IN AN ORGANIZATION INBOUND EMAIL TRAFFIC

(71) Applicant: Vade Secure SASU, Hem (FR)

(72) Inventors: Sébastien Goutal, San Francisco, CA (US); Jean-Marc Taing, Nogent-sur-Marne (FR); Maxime Marc Meyer, Lubersac (FR)

(73) Assignee: Vade Secure SASU, Hem (FR)

( * ) Notice: Subject to any disclaimer, the term of this patent is extended or adjusted under 35 U.S.C. 154(b) by 123 days.

(21) Appl. No.: 18/541,987

(22) Filed: Dec. 15, 2023

(65) Prior Publication Data

US 2025/0202943 A1 Jun. 19, 2025

(51) Int. Cl.
*H04L 9/40* (2022.01)
*G06Q 10/107* (2023.01)

(52) U.S. Cl.
CPC ........... *H04L 63/20* (2013.01); *G06Q 10/107* (2013.01); *H04L 63/1483* (2013.01)

(58) Field of Classification Search
CPC .... H04L 63/20; H04L 63/1483; G06Q 10/107
See application file for complete search history.

(56) References Cited

U.S. PATENT DOCUMENTS

| 9,398,047 | B2 | 7/2016 | Goutal | |
|---|---|---|---|---|
| 10,021,134 | B2 | 7/2018 | Goutal | |
| 12,143,418 | B2 * | 11/2024 | Gopathy | H04L 63/0281 |
| 2010/0017880 | A1 * | 1/2010 | Masood | G06F 21/56 |
| | | | | 709/224 |
| 2010/0325227 | A1 * | 12/2010 | Novy | H04L 51/066 |
| | | | | 709/206 |
| 2020/0252803 | A1 * | 8/2020 | Shah | G06N 20/20 |
| 2023/0359728 | A1 * | 11/2023 | Wanpen | G06Q 20/3276 |

OTHER PUBLICATIONS

Anti-Fraud and Anti-Phishing Protection, © 2003—2023 Barracuda Networks (3 pages).

(Continued)

*Primary Examiner* — Viet D Vu
(74) *Attorney, Agent, or Firm* — YOUNG LAW FIRM, P.C.

(57) ABSTRACT

A computer-implemented method of detecting a Uniform Resource Locator (URL) encoded in a barcode in an email includes receiving the email, and prior to delivering the received email, providing the received email to a barcode URL detection engine. The barcode URL detection engine may be configured to parse the received email, build a structured representation of the email, extract an image from the structured representation of the email, send the extracted image to a barcode scanner and receive a result back from the barcode scanner. When the received result indicates that the extracted image contains a barcode storing a HTTP or HTTPS URL, the barcode URL detection engine may determine whether the URL is suspicious. When the URL is determined to be suspicious, the barcode URL detection engine may perform one or more selected actions to protect the intended recipient of the received email from the suspicious URL.

41 Claims, 7 Drawing Sheets

(56) References Cited

OTHER PUBLICATIONS

Email Security Cloud Gateway—TargetedThreat Protection—URL Protection Overview, Mar. 11, 2023, © 2020 Mimecast Services limited (5 pages).
Nathaniel Raymond, Major Energy Company Targeted in LargeQR Code Phishing Campaign, Aug. 16, 2023 Blog Post, ©2023 Cofense. All rights reserved. (11 pages).
Manage Labels, Apr. 13, 2023, Gmail | Google Developers downloaded from https://developers.google.com/gmail/api/guides/labels (3 pages).
QR Code Phishing (Quishing) Attacks Have More Than Quadrupled in Just One Month, Oct. 23, 2023, downloaded from (https://perception-point.io/blog/qr-code-phishing-quishing-attacks-have-more-than-quadrupled-in-just-one-month/) (8 pages).
QR Code Red: Quishing Attacks and How to Prevent Them, Aug. 24, 2023, Perception Point, HTTPS://perception-point.io (15 pages).
Jonathan B. Postel, RFC 821 Simple Mail Transfer Protocol, Aug. 1982, Information Sciences Institute University of Southern California (72 pages).
David H. Crocker, RFC 822 Standard for the Format of ARPA Internet Text Messages, Aug. 1982, Dept. of Electrical Engineering University of Delaware, Newark, DE 19711 (50 pages).
T. Berners-Lee, Uniform Resource Locator (URL), Dec. 1994, Nework Working Group Request for Comments: 1738 Category: Standards Track (25 pages).
N. Freed, Multipurpose Internet Mail Extensions (MIME) Part One: Format of Internet Message Bodies, Nov. 1996, Network Working Group, Request for Comments: 2045 (31 pages).
N. Freed, Multipurpose Internet Mail Extensions (MIME) Part Two: Media Types, Nov. 1996, Network Working Group, Request for Comments: 2046 (44 pages).
R. Troost, Communicating Presentation Information in Internet Messages: The Content-Disposition Header Field, Aug. 1997, Network Working Group, Request for Comments: 2183 (12 pages).
L. Masinter, The "data" URL scheme, Aug. 1998, Network Working Group, Request for Comments: 2397 (5 pages).
P. Resnick, Editor, Internet Message Format, Apr. 2001, Network Working Group, Request for Comments: 2822 (51 pages).
The Domain Block List (DBL), Spamhous, (c) 1998-2023 The Spamhaus Project SLU (1 Page).

\* cited by examiner

```
Content-Type: application/octet-stream
Content-Transfer-Encoding: base64
Content-Disposition: attachment; filename=invoice.pdf
```

FIG. 6

```
Content-Type: image/png; name="image01.png"
Content-Description: image01.png
Content-Disposition: inline; filename="image01.png"; size=17538
Content-ID: <image01.png@01D9E5EF.6BC4C541>
Content-Transfer-Encoding: base64
```

FIG. 7

```
<img src="data:image/png;base64,..."/>
```

FIG. 8

```
X-BarcodeURL-Status: true
X-BarcodeURL-Desc:    cid=<image01.png@01D9E5EF.6BC4C541>;
type=qrcode; url=<https://www.google.com/>
```

DETECTION OF BARCODE URL IN AN ORGANIZATION INBOUND EMAIL TRAFFIC

BACKGROUND

QR code (ISO/IEC 18004:2015) is a 2D (two-dimensional) matrix barcode, with black squares (or modules) arranged in a square grid on a white background. The size of the QR code varies, ranging from 21×21 modules to 177× 177 modules, in increments of 4 modules on each side. Different types of data can be stored in the QR code, including numeric data, alphanumeric data, 8-bit binary data and Kanji. Mixed use of different types of data is also possible. QR codes also include error correction, with four levels of error correction supported, namely, L (Low), M (Medium), Q (Quartile) and H (High). QR codes are notably used to store Uniform Resource Locators (URLs), enabling users to conveniently scan them with their smartphone, which will redirect a browser of the users' mobile device to some resource on the Internet, such as a webpage or a file.

As QR codes have become increasingly popular, cybercriminals have started to use them to conceal malicious links in email borne cyberattacks. These QR code based phishing attacks, known as 'Quishing' (a portmanteau of 'QR code' and 'Phishing'), notably target organizations, with different attack scenarios being reported. Some of these scenarios include renewing a password after its expiration, renewing a security session in the context of an MFA (Multi Factor Authentication) policy, signing a document electronically, or accessing an HR or payroll document. Furthermore, the use of QR codes poses certain challenges to security vendors, as decoding a QR code requires leveraging complex and costly algorithms (e.g., computer vision), resulting in performance and scalability issues related to filtering the email traffic in real time and at scale. This, in turn, further reinforces the cybercriminal's interest in QR code based attacks. While all barcode based phishing attacks reported thus far leverage only QR code format, it is theoretically possible that other formats of barcodes may be used in the future to carry out cyberattacks. Indeed, 2D barcode formats such as Data Matrix (ISO/IEC 16022:2006), Aztec (ISO/IEC 24778:2008) or PDF417 (ISO/IEC 15438:2015) can store alphanumeric content, and thus can conceal malicious links.

What is needed, therefore, are computer-implemented technical methods for protecting computers and computer-containing devices from the potentially malicious code pointed at by links embedded in barcodes that are directly or indirectly delivered via electronic messages such as email. What are also needed are technology-based methods for improving the functioning and performance of computers, computing and communication devices in detecting barcode URL in individuals' or an organization's inbound electronic messages, to include inbound email traffic.

DETAILED DESCRIPTION

Described and shown herein is a new technology named barcode URL detection technology that aims at detecting, in the inbound email traffic of an organization (such as a corporation, an enterprise, an educational institution, a government agency, or nonprofit organization), emails that contain a barcode (e.g., a QR code) that may unwittingly lead the recipient to a fraudulent website, or to a malicious file hosted online.

Three different use cases are presented herein:
- a barcode image that is stored in an attachment: the barcode is embedded in the email as an attachment, which is the technique used by most cybercriminals;
- a barcode image that is stored in the 'text/html' part with 'data' URL scheme: the barcode is embedded in the 'text/html' part by leveraging the 'data' URL scheme described in RFC 2397; and
- a barcode image that is hosted online, where the barcode image URL is stored in the 'text/html' part. In this case, when the end user opens the email, the content of the image is fetched, and the image displayed to the end user.

Figure 1:
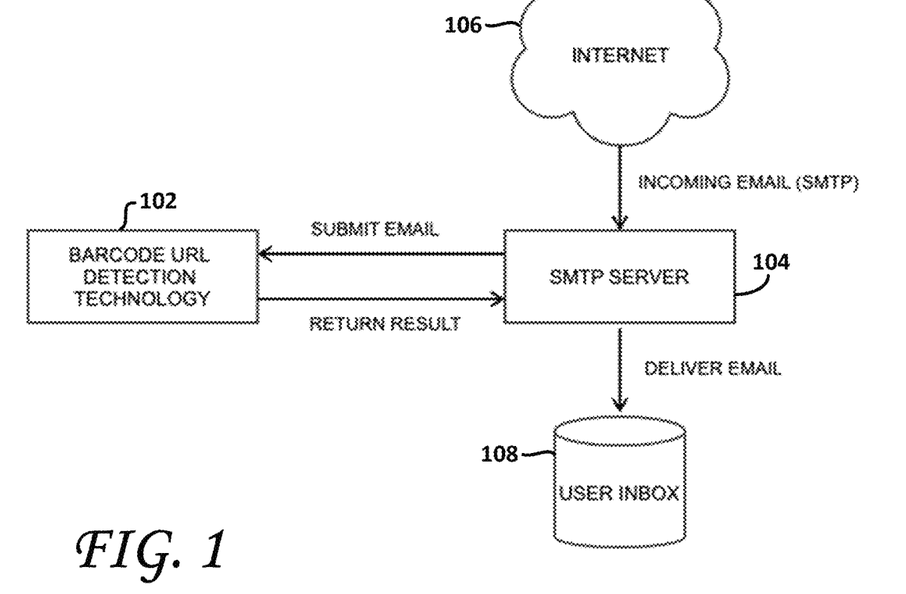
FIG. 1 is a block diagram of an embodiment of the present computer-implemented method and devices configured for barcode URL detection, deployed in an architecture with an SMTP server.

Embodiments of the barcode URL detection technologies disclosed herein may be deployed in different environments. A first environment in which the present barcode URL detection technology 102 may be deployed is shown in FIG. 1, where the organization has deployed a SMTP (Simple Mail Transfer Protocol) server 104 that communicates with the Internet 106 via the SMTP protocol. The SMTP server 104 includes an MTA (Mail Transfer Agent) that is responsible for sending and receiving emails, and an MDA (Mail Delivery Agent) that is responsible for storing emails. Being responsible for receiving emails, the MTA may be configured to interact with filtering technologies to prevent malicious emails from reaching the organization. Examples of filtering technologies include anti-spam technologies, anti-phishing technologies, anti-malware technologies, and different types of blocklists (such as IP addresses blocklists, IP ranges blocklists, domains blocklist, URL blocklists). In this context, the barcode URL detection technology 102 disclosed herein is configured to analyze an email, and then return the result of the analysis to the MTA. The MTA then performs a certain action depending on the analysis result. For example, if an email is detected as or determined to be or include spam, phishing, or malware, then the MTA may delete the email, or alternatively move it to a specific folder (e.g., a 'Junk' or 'Spam' folder) within the user's inbox 108. In the case of the detection of a barcode containing a URL, such an action may include, according to an embodiment, to add a banner (and/or another human or machine perceptible indicator) to the email to warn the end user of the presence of a malicious URL contained in the email before the email is delivered to the user's inbox 108.

Figure 2:
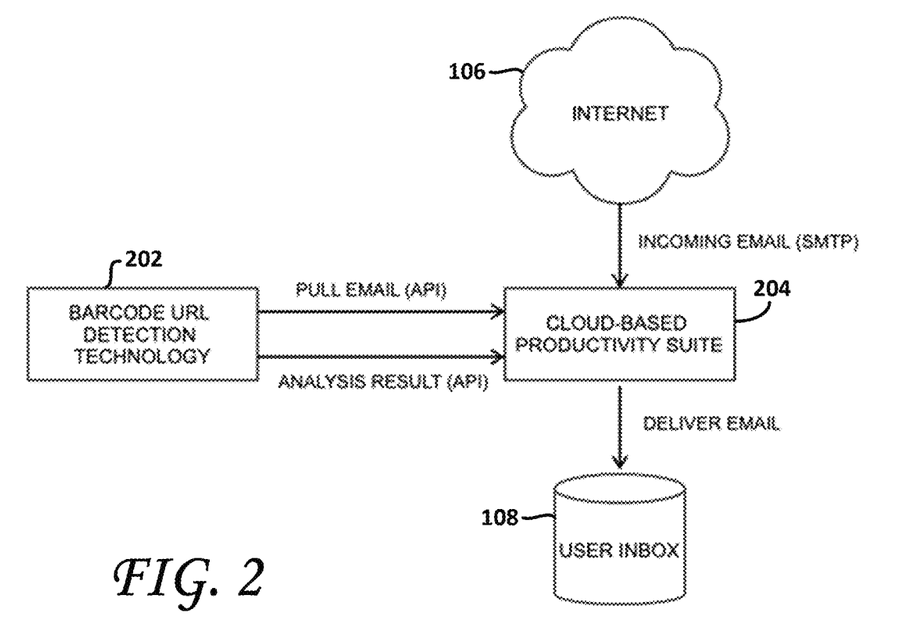
FIG. 2 is a block diagram of an embodiment of the present computer-implemented method and devices configured for barcode URL detection, deployed in an architecture including a cloud-based productivity suite and a 'Pull' Application Program Interface (API).

A second environment is shown in FIG. 2. In this environment, the organization uses a cloud-based productivity suite 204, such as Microsoft 365 or Google Workspace. In this case, the cloud-based productivity suite 204 is responsible for sending, receiving, and storing emails. The cloud-based productivity suite 204 also provides security technologies to filter the inbound and outbound email traffic. Additional third-party technologies may be used to enhance the protection, and these technologies can interact with the cloud-based productivity suite 204 via the different API endpoints provided by the cloud-based productivity suite. The present barcode URL detection technology 202, according to another embodiment, may be configured to periodically query the cloud-based productivity suite 204 via a specific API endpoint to fetch (pull) any new incoming email. According to this embodiment, the barcode URL detection technology 202 may be configured to analyze the new incoming email, and then return the result of the analysis to the cloud-based productivity suite 204 via another API endpoint.

Figure 3:
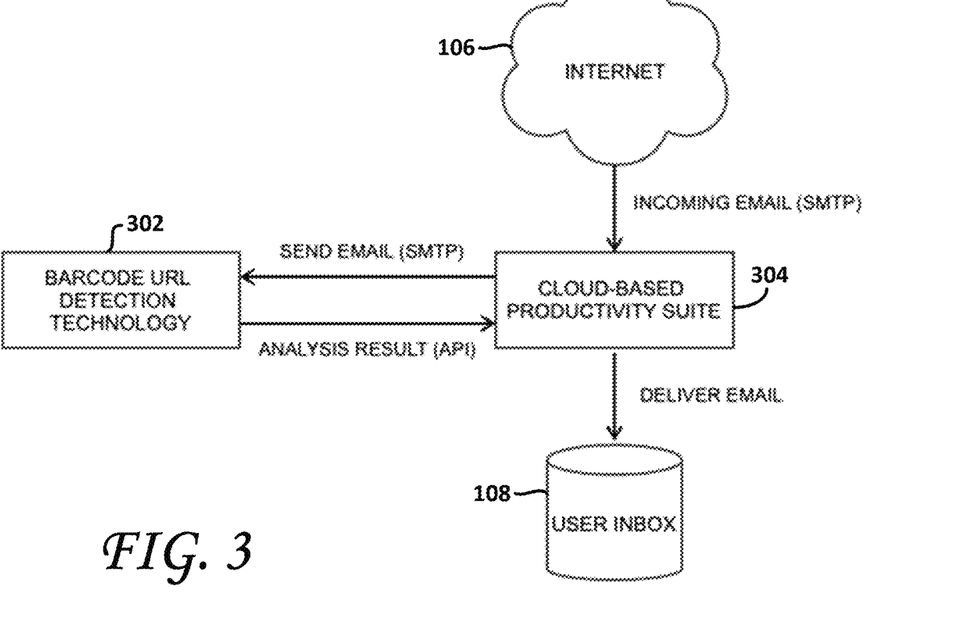
FIG. 3 is a block diagram of an embodiment of the present computer-implemented method and devices configured for barcode URL detection, deployed in an architecture having cloud-based productivity suite (Copy SMTP traffic).

A third environment is shown in FIG. 3. The environment shown in FIG. 3 is similar to the environment shown in FIG. 2, with the exception that the cloud-based productivity suite 304 sends, via SMTP, a copy of the email traffic to the barcode URL detection technology 302. In this case, it is not necessary for the barcode URL detection technology 302 to periodically query the cloud-based productivity suite 304 to fetch new incoming emails, as such are delivered by the could-based productivity suite 304.

Figure 4:
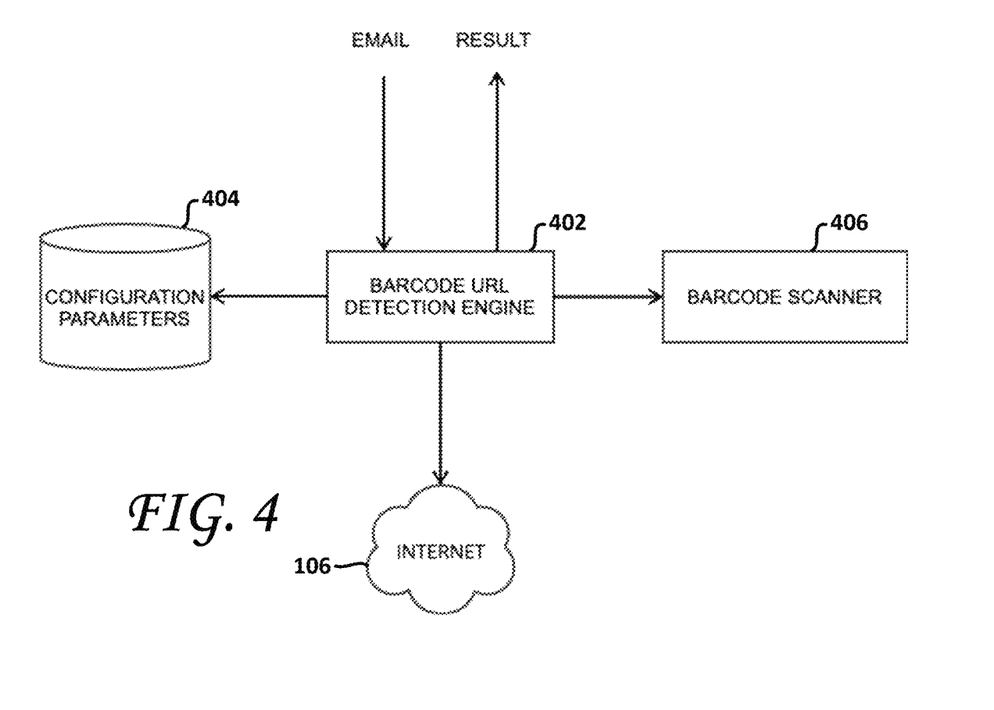
FIG. 4 is a block diagram of another embodiment of the present computer-implemented method and devices configured for barcode URL detection.
Figure 5:
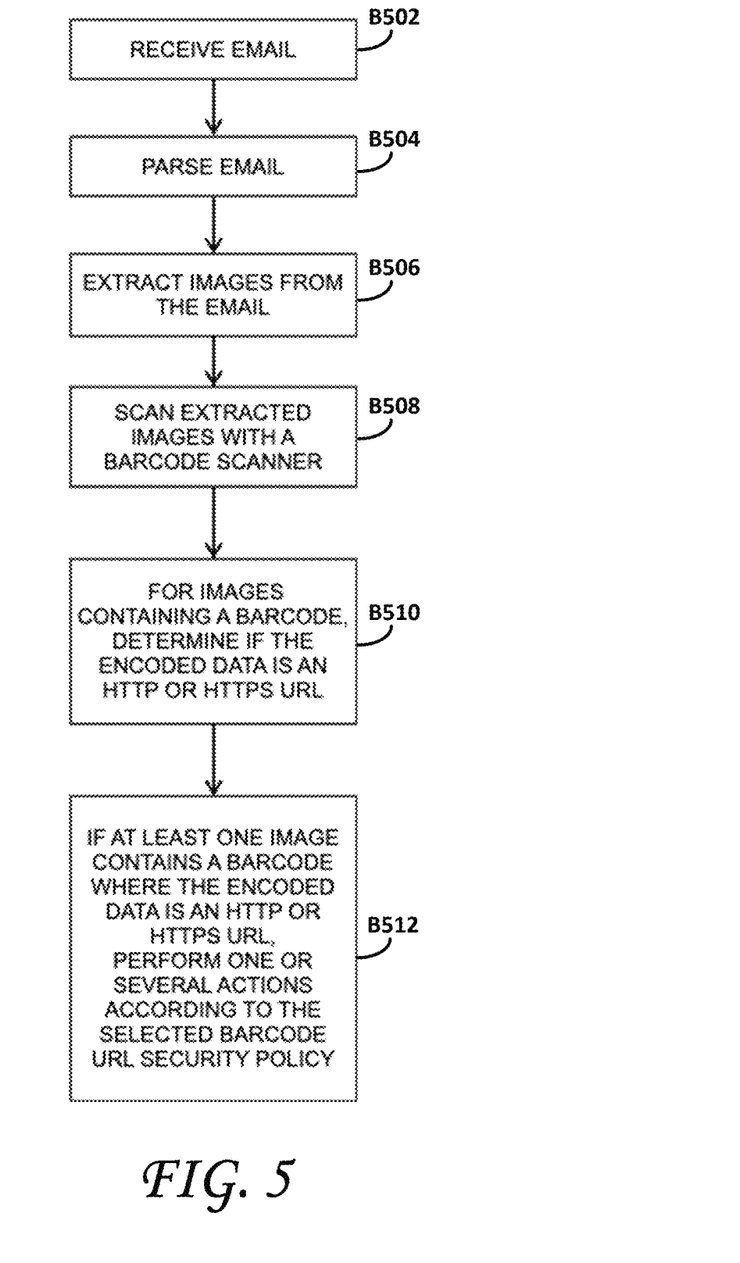
FIG. 5 is a flowchart of an embodiment of the present computer-implemented method and devices configured for barcode URL detection.

FIG. 4 is a block diagram of different components of the barcode URL detection technology 102, 202, 302 according to an embodiment. The central component shown in FIG. 4 is the barcode URL detection engine 402. The barcode URL detection engine 402 takes an email as an input and outputs a result. FIG. 5 is a flowchart that details aspects of the functioning of the barcode URL detection engine 402 shown in FIG. 4. Considering now FIGS. 4 and 5 together, the barcode URL detection engine 402 uses a store of configuration parameters 404 that may be loaded at startup and that may be updated at runtime. The configuration parameters 404 may be integral to the barcode URL detection engine 402 or stored remotely and accessed thereby, either locally or over a network such as the Internet 106. The barcode URL detection engine 402 may communicate with the Internet 106 (and/or some other network) to, for example, fetch an image that is hosted online. The barcode URL detection engine 402 may also be configured to access a barcode scanner 406, that may be deployed locally, on premise, or may be deployed remotely and coupled to the Internet 106. The barcode scanner 406 may also be available as a static or a dynamic library. Examples of implementations of barcode scanners include ZXing (github.com/zxing/zxing) and ZBar (zbar.sourceforge.net/). Communication with the barcode scanner 406 may be performed via an API. Below is a description of a computer-implemented method of detecting a barcode URL, as performed by the barcode URL detection engine 402 upon receipt of an email by an organization.

Reception and Parsing of the Email

First, the raw content of the email is received by the barcode URL detection engine 402, as shown at B502 in FIG. 5. Then, the raw content of the email is parsed at B504 by an email parser to build a structured representation of the received email. The format of email supported by the email parser may be defined by an RFC (Request for Comment). Several RFCs define the format of emails, with different levels of maturity within the Internet standardization process. The most mature RFC is RFC 822, which defines the format of electronic mail, and which is considered an Internet Standard. The second most mature is the RFC 2822 that updates the RFC 822 and is considered a Draft Standard. Once the email is successfully parsed at B504, a structured representation of the email is available, which contains header fields extracted from the email header section and the one or several parts extracted from the email body section. Below, the three different use cases introduced previously will be discussed in turn.

Barcode Image Stored in an Attachment

In this implementation, the different parts of the email body are analyzed in order to find the attachment(s) that contain an image. According to RFC 2183, attachments can be identified by analyzing the 'Content-Disposition' header field. In the case of an inline attachment ('Content-Disposition' is set to 'inline'), the attachment is considered to be part of the email body and is displayed automatically to the end user. In the case of a non-inline attachment ('Content-Disposition' is set to 'attachment'), the attachment is considered to be separate from the email body and is not displayed automatically. The 'Content-Disposition' header field may also contain additional parameters that provide additional details about the attachment (e.g., 'filename' and 'size'). According to RFC 2045 and RFC 2046 (Multipurpose Internet Mail Extensions (MIME) Part Two-Media Types, 1996), images can be identified by analyzing the 'Content-Type' header field, and then looking for the 'image' media type, followed by a media subtype that specifies the format of the image (e.g., 'jpeg', 'png'). The 'Content-Type' header field may also contain an optional 'name' parameter.

Image attachments can then be decoded. For this purpose, the 'Content-Transfer-Encoding' header field is analyzed to determine the type of encoding, as specified in the RFC 2045 (Freed & Borenstein, RFC 2045—Multipurpose Internet Mail Extensions (MIME) Part One: Format of Internet Message Bodies, 1996). Encoding mechanisms may include, for example, '7bit', '8bit', 'binary', 'quoted-printable' or 'base64'.

Figure 6:
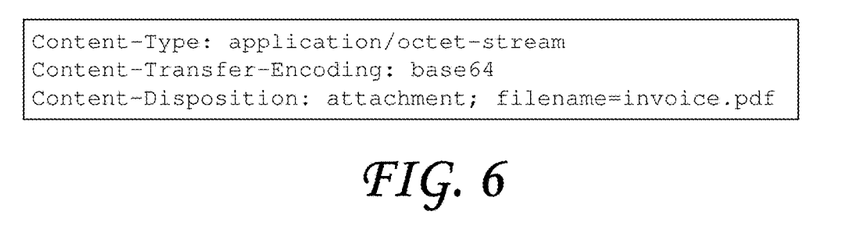
FIG. 6 shows an example of a header section of an email body part, configured for non-inline attachment of a PDF file.
Figure 7:
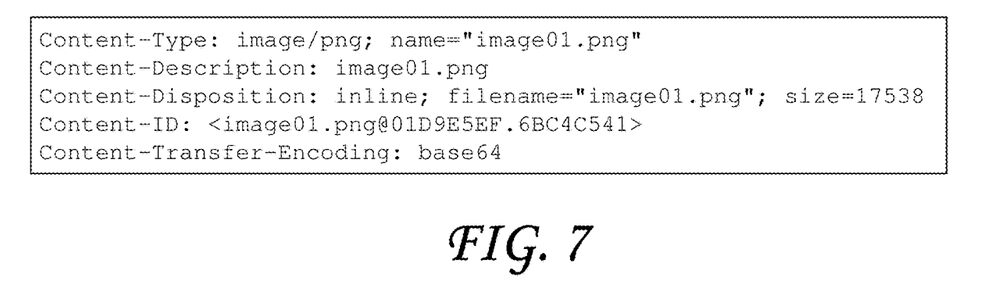
FIG. 7 shows an example of a header section of an email body part, configured for inline attachment of a PNG image.

Two examples of a header section of an email body part are now presented. In FIG. 6 the header section describes a non-inline attachment that contains a PDF file named 'invoice.pdf'. As this attachment does not contain an image, it may be discarded. The header section in FIG. 7 describes an inline attachment that contains an image, more precisely a PNG image named 'image01.png'. The image is encoded Base64. As this attachment is relevant, it is decoded.

Barcode Image Stored in 'text/html' Part With 'data' URL Scheme

Figure 8:
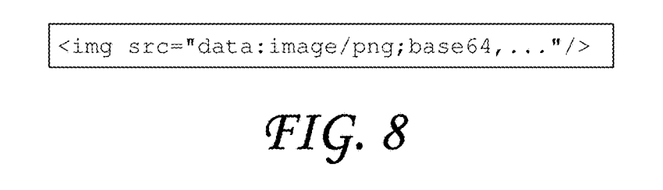
FIG. 8 shows a portion of 'text/html' part of an email, configured for using a 'data' URL scheme to store an image.

The use of an attachment is the standard technique to embed an image in an email. An alternative technique is the 'data' URL scheme defined in RFC 2397. With this technique, it is possible to store the content of an image in the 'src' attribute of an '<img>' HTML element within the 'text/html' part of the email. FIG. 8 illustrates the use of this technique, where the content of a PNG image (media type and subtype are 'image/png') is encoded in Base64 (encoding is 'base64') and stored in the 'src' attribute (in FIG. 8, the encoded content of the image is represented by ' . . . ' for the sake of simplicity).

For this second case, the barcode URL detection engine 402 analyzes the different parts of the email body, looking for a 'Content-Type' header field that contains a 'text/html' media type and subtype. The 'Content-Transfer-Encoding' header field is then analyzed to determine the type of encoding, and then the decoding of the content is performed. The raw HTML content is then parsed by an HTML parser, to build a structured representation. An example of structured representation is the Document Object Model (DOM) tree structure, which allows easy navigation within the tree. Then, the '<img>' HTML elements can be listed and analyzed. In the case a 'data' URL scheme is found in the 'src' attribute of an '<img>' HTML element, the presence of an image can be determined by analyzing the media type and subtype (e.g. 'image/png') and decoding of the encoded image can be performed according to the algorithm specified (e.g. 'base64').

Barcode Image Hosted Online, and Barcode Image URL Stored in 'text/html' Part Instead of embedding the content of an image in an email, it is a standard practice for bulk email campaigns to host an image online, and then store the image URL in the 'src' attribute of an '<img>' HTML element within the 'text/html' part of the email. This technique allows savings in both bandwidth and storage, as the size of the email is greatly reduced. In this case, when the end user opens the email, the content of the image is fetched, and the image displayed to the end user.

For this third case, the barcode URL detection engine 402 analyzes the different parts of the email body, looking for a 'Content-Type' header field that contains a 'text/html' media type and subtype. The 'Content-Transfer-Encoding' header field is then analyzed to determine the type of encoding, and then the decoding of the content is performed. The raw HTML content is then parsed by an HTML parser, to build a structured representation, such as the Document Object Model (DOM) tree structure. Then, the '<img>' HTML elements can be listed and analyzed. In the case a HTTP or HTTPS URL is found in the 'src' attribute of an '<img>' HTML element, the image content is fetched over the Internet 106.

Barcode Image Analysis with Barcode Scanner

After the images are extracted from the received email at B506, the extracted image(s) may then be analyzed with a barcode scanner 406, as shown at B508 in FIG. 5. That is, the extracted image(s) may be sent by the barcode URL detection engine 402 to a remote barcode scanner 406 over a computer network, such as the Internet 106. A barcode scanner 406 takes as an input an image and, if a barcode is found, returns the following information: the type of the barcode (e.g., QR code, Data Matrix), its position within the image (e.g., coordinates of upper left and lower right corners), and the data stored in the barcode. An example of barcode scanner 406 is ZXing (github.com/zxing/zxing), an open-source, multi-format 1D/2D barcode image processing library. ZXing supports many 1D and 2D barcode formats, including QR code that is defined in ISO/IEC 18004:2015. After the scan of the image by the barcode scanner in B508, and in the case where a barcode is detected, the data stored in the barcode is then analyzed. For images that contain a barcode, it may be determined if the encoded data encodes a link, that is, an HTTP or HTTPS URL as shown in B510. If so, one or more actions may be performed according to the relevant barcode URL security policy, as detailed below and as shown at B512 in FIG. 5. If none of the extracted images contain a barcode encoding an HTTP or HTTPS URL, the images may be discarded.

Barcode URL Security Policy

If at least one image containing a barcode that stores an HTTP or HTTPS URL has been identified at B510, then one or more barcode URL security policies may be applied. One or several predetermined actions as defined by the selected barcode URL security policy or policies may be performed sequentially in a particular order to protect both the email-receiving computer system and the recipient of the email. The list of predetermined actions and the actions themselves may be configured. The availability and applicability of certain actions may depend on the environment where the barcode URL detection technology is deployed.

A first type of action according to an embodiment is to determine if the HTTP or HTTPS URL is unsafe or suspicious by querying a remote URL reputation service with the URL. A first type of URL reputation service is a URL Domain Name System block list (DNSBL), where the service stores a list of unsafe URLs in a DNS zone, and the client queries the service by performing a DNS (Domain Name System) lookup. DNSBL is a high-performing and widespread software mechanism to filter email traffic, where the filtering is based on different elements, such as URLs, domains and IP addresses. A second type of URL reputation service is a HTTP-based URL block list service, that stores a list of unsafe URLs, and where the service exposes to the client one or several HTTP endpoints to query the service.

A second type of action according to an embodiment is to determine if the HTTP or HTTPS URL is unsafe or suspicious by querying a domain reputation service with the domain of the URL. A first type of domain reputation service is a Domain Name System block list (DNSBL), where the service stores a list of unsafe domains in a DNS zone. An example of domain DNSBL is Spamhaus DBL (Spamhaus, 2023). A second type of domain reputation service is a HTTP-based domain block list service.

Figure 9:
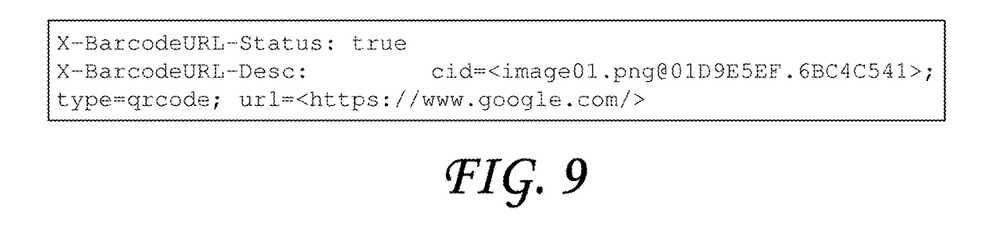
FIG. 9 shows a portion of a header section of an email indicating that a barcode storing a URL is detected, according to an embodiment.

A third type of action that may be included in a selected barcode URL security policy according to an embodiment is to add one or several extended headers to the email to indicate that a barcode storing a URL has been detected in the email. Extended headers are non-standard headers that are used to store additional information regarding the email. Extended headers may be used to store the result of the analysis by the barcode URL detection engine 402. Consider the attachment described in FIG. 7, and assume the hypothesis that the image image01.png contains a QR code storing the 'https://www.google.com'
URL. Then the following extended headers may be added, where the first header indicates that a barcode storing a URL has been detected, and the second header provides additional information on the detection: the 'Content-ID' of the attachment containing the image, the type of barcode (e.g., QR code), and the URL stored in the barcode, as shown in FIG. 9.

A fourth type of action may be to add a prefix to the 'Subject' header to indicate that the email contains a barcode storing a URL. For instance, the email 'Subject' header may be prefixed with '[BarcodeURL]' or similar warning indicator.

A fifth type of action defined in a barcode URL security policy may be to move the email to a specific folder. For instance, the email may be moved to a folder named 'BarcodeURL'. The email may also be moved to a 'Spam' or a 'Junk' folder or even redirected to another email address for special handling.

A sixth type of action is to delete the email, as it is considered potentially dangerous and should not be opened by the recipient.

A seventh type of action would be to add a label to the email, where the label indicates that the email contains a barcode storing a URL. For instance, Google Workspace provides the ability to use labels to tag, organize and categorize emails. Moreover, multiple labels may be applied to one email. Common labels in Google Workspace include 'SPAM', 'UNREAD' and 'IMPORTANT'. A label such as 'BARCODEURL' may be used to tag emails that contain a barcode storing a URL.

An eighth type of action may include adding a banner to the body of the email. The banner may include a warning, in the form of a text or a visual cue, indicating the presence of a barcode storing a URL. The banner may also include additional information, such as the type of barcode (e.g., QR code), and the URL extracted.

A ninth type of action is to replace a barcode storing a URL with a template image, to inform the user that a suspicious barcode was detected and removed. This template image may include a warning, in the form of a text or a visual cue or some other form of human-perceptible cue. As the barcode may only occupy a certain area of the original image, the template image may only replace the area occupied by the barcode.

A tenth type of action is based on URL rewriting, a technique that provides an additional layer of protection for emails that have already been delivered to the end user inbox 108. In this embodiment, a barcode storing a URL is replaced with a barcode storing a rewritten URL, where the rewritten URL points to a URL scanning service, so that the original URL is analyzed to detect the presence of any malicious content (such as a phishing webpage or a malicious file) when the end user explores the rewritten URL. An example of URL scanning service is https://www.isitphishing.ai/, that takes as an input a URL, and then fetches the content associated to the URL, follows any redirections found, and analyzes the HTML content of the final webpage to determine whether the content is harmful or safe. If the URL is considered harmful, then a warning message is displayed to the end user, in the form of a text or a visual cue. However, if the URL is considered safe, then the user is redirected to the original URL. As the barcode may only occupy a certain area of the image, the rewritten barcode may only replace the area occupied by the barcode.

In the case in which the 'text/html' part of the email contains in an '<img>' HTML element a URL leading to a barcode image hosted online, similar actions may be taken:
The URL may be replaced with a template image URL, where the template image informs the user that a suspicious barcode was detected and removed. This template image may include a warning, in the form of a text or a visual cue;
The URL may be replaced with a rewritten barcode URL, so that the suspicious URL is analyzed to detect the presence of any malicious content (such as a phishing webpage or a malicious file) when the end user explores the rewritten barcode.

Figure 10:
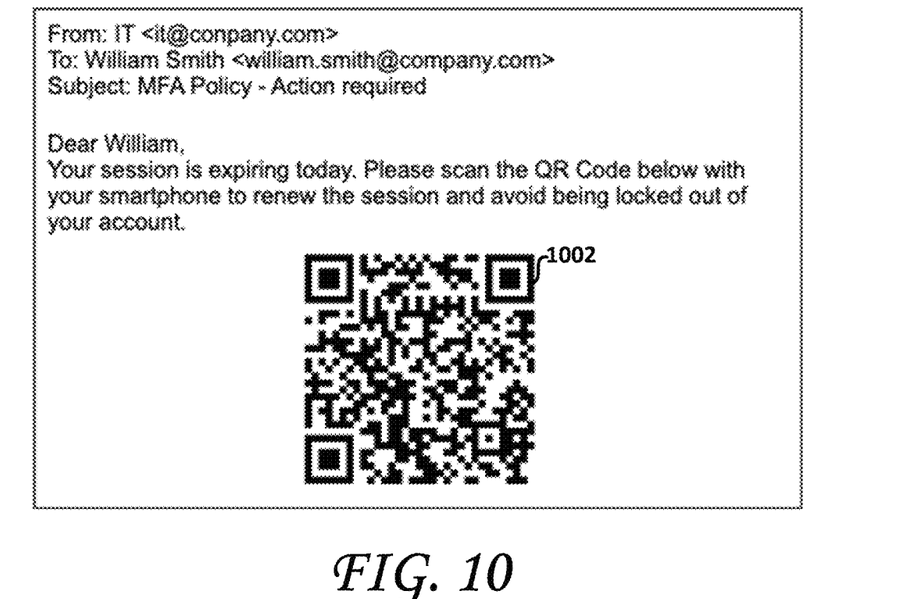
FIG. 10 shows an example of a QR code phishing email.

An example of a QR code phishing attack is now described, to illustrate the use of the present barcode URL detection technology, according to the embodiments described and shown herein. In this example, the attacker registers a fraudulent domain name ('conpany.com') close to the targeted organization domain name ('company.com'), and then sends an email from this fraudulent domain to a member of the targeted organization. The attacker pretends to be from the IT team of the targeted organization and asks the victim (the recipient of the malicious email) to scan a fraudulent QR code in the context of an MFA (Multi Factor Authentication) session renewal. The QR code contains a link to a fraudulent website ('http://www.phishingurl.com') that will be used to steal the victim's credentials (email, password). The QR code is an image file that is sent as an inline attachment and, as such, can be seen directly in the email message body by the recipient. A representative one such QR code is shown in FIG. 10 at 1002.

The scanning of the inline attachment 1002 by a barcode scanner allows the detection of a QR code that contains the following URL: 'http://www.phishingurl.com'. At this point, the action or actions specified in different security policies may be carried out to reduce the risk associated with the QR code. Two examples of security policies are presented thereafter.

Figure 11:
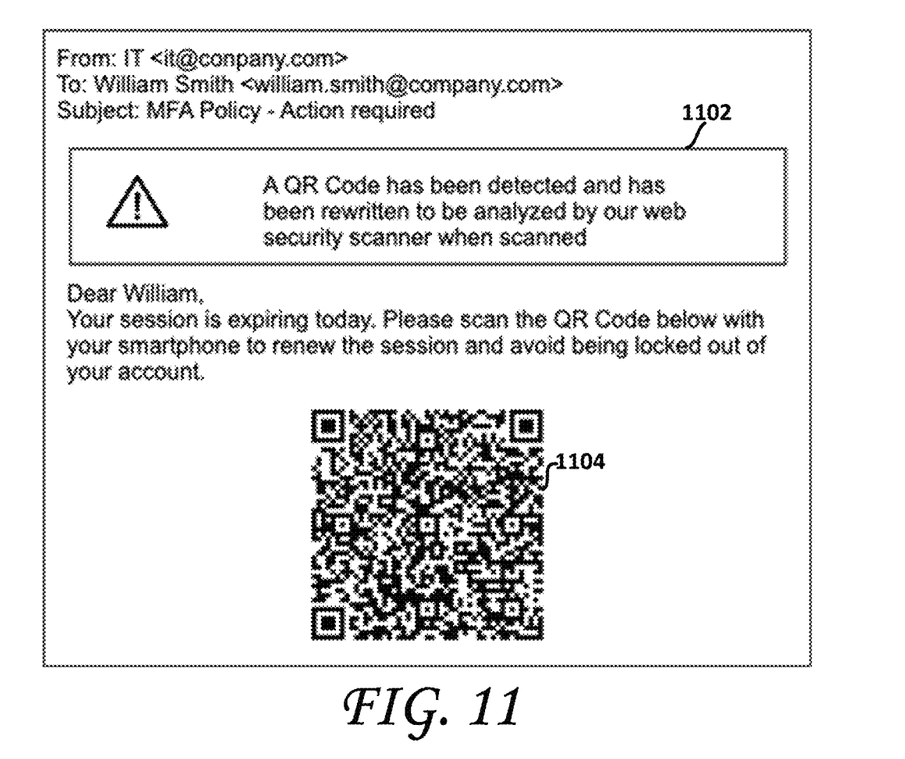
FIG. 11 shows the email of FIG. 10, modified to include a banner and a rewritten QR code, according to an embodiment.

A first security policy may include an action to modify the QR code 1002, so that the link stored in the original QR code 1002 is analyzed by a URL scanning service when the recipient scans the modified QR code with a smartphone. For instance, if we consider the URL scanning service 'https://urlscanningservice.com/', then we can require the original QR code URL to be analyzed by a URL scanning service. An example of URL rewriting would be to append to the URL scanning service base URL a parameter key and value, where the value is the URL to be scanned encoded in Base64URL. The resulting rewritten URL may be 'https://urlscanningservice.com/u/aHR0cDovL3d3dy5waGlzaGluZ3VybC5jb20', where the parameter key 'u' indicates that the parameter is a URL, and 'aHR0cDovL3d3dy5waGlzaGluZ3VybC5jb20' is the encoding in Base64URL of 'http://www.phishingurl.com'. The resulting URL may then be encoded as a new rewritten QR code, and this rewritten QR code 1104 may replace the existing original QR code 1002 of FIG. 10. Additionally, a banner 1102 may be added to the email body to inform the recipient that the originally-received QR code 1002 of FIG. 10 has been rewritten as shown at 1104 in FIG. 11. In FIG. 11, the QR code 1002 has been rewritten as the comparatively more information-dense QR code 1104, and a banner 1102 has been added in the email body to inform the recipient ('A QR code has been detected and has been rewritten to be analyzed by our URL scanning service when scanned').

Figure 12:
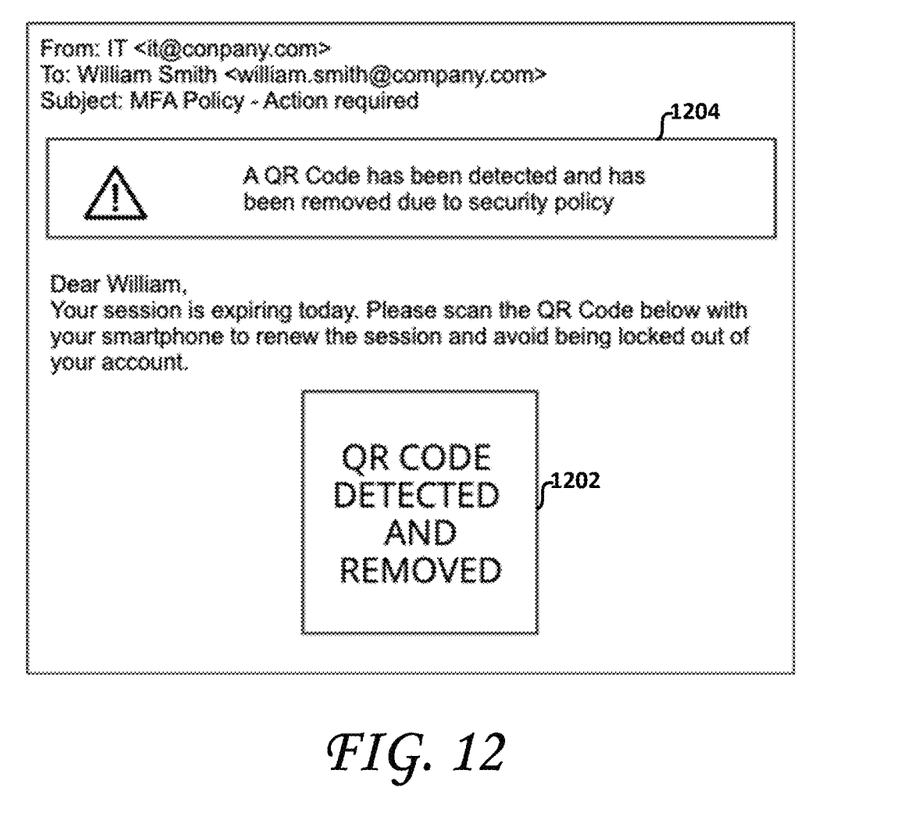
FIG. 12 shows the email of FIG. 10, modified to include a banner and a removed QR code, according to an embodiment.

A second security policy may be to remove the QR code, in the case in which the organization does not allow QR codes to be transmitted by emails, whether for the entire organization, or only for certain members of the organization considered at risk. In this case, the QR code 1002 may be replaced by an image 1202 indicating that the QR code has been removed, and a banner 1204 may be added to the email body to inform the recipient. This is illustrated in FIG. 12, where the QR code has been removed and replaced by a picture 1202 to inform the recipient ('QR CODE DETECTED AND REMOVED'). As shown, a banner 1204 has been added in the email body as well ('A QR code has been detected and has been removed due to security policy').

Physical Hardware

Figure 13:
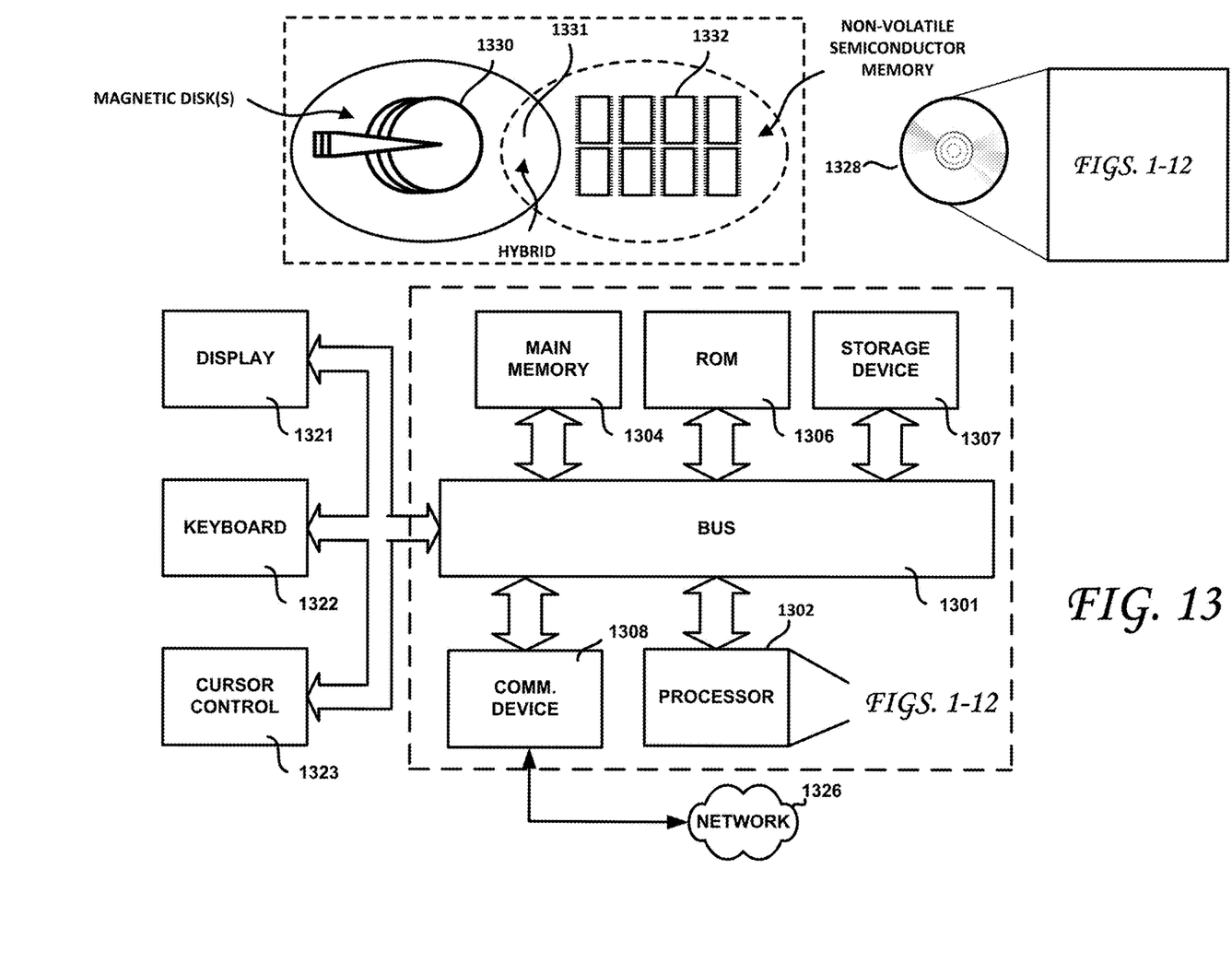
FIG. 13 is a block diagram of a computing device suitable for carrying out a computer-implemented method of detecting suspicious URLs in barcodes of received emails, according to an embodiment.

FIG. 13 illustrates a block diagram of a computing device with which embodiments may be implemented. The computing device of FIG. 13 may include a bus 1301 or other communication mechanism for communicating information, and one or more processors 1302 coupled with bus 1301 for processing information. The computing device may further comprise a random-access memory (RAM) or other dynamic storage device 1304 (referred to as main memory), coupled to bus 1301 for storing information and instructions to be executed by processor(s) 1302. Main memory (tangible and non-transitory, which terms, herein, exclude signals per se and waveforms) 1304 also may be used for storing temporary variables or other intermediate information during execution of instructions by processor 1302. The computing device of FIG. 13 may also include a read only memory (ROM) and/or other static storage device 1306 coupled to bus 1301 for storing static information and instructions for processor(s) 1302. A data storage device 1307, such as a magnetic disk and/or solid-state data storage device may be coupled to bus 1301 for storing information and instructions—such as would be required to carry out the functionality shown and disclosed relative to the present FIGS. 1-12. The computing device may also be coupled via the bus 1301 to a display device 1321 for displaying information to a computer user. An alphanumeric input device 1322, including alphanumeric and other keys, may be coupled to bus 1301 for communicating information and command selections to processor(s) 1302. Another type of user input device is cursor control 1323, such as a mouse, a trackball, or cursor direction keys for communicating direction information and command selections to processor(s) 1302 and for controlling cursor movement on display 1321. The computing device of FIG. 13 may be coupled, via a communication interface (e.g., modem, network interface card or NIC) 1308 to a network 1326 such as the Internet, as shown at 106 in FIGS. 1-4.

The storage device 1307 may include direct access data storage devices such as magnetic disks 1330, non-volatile semiconductor memories (EEPROM, Flash, etc.) 1332, a hybrid data storage device comprising both magnetic disks and non-volatile semiconductor memories, as suggested at 1331. References 1304, 1306 and 1307 are examples of tangible, non-transitory computer-readable media having data stored thereon representing sequences of instructions which, when executed by one or more computing devices, implement aspects of the embodiments described and shown herein. Some of these instructions may be stored locally in a client computing device, while others of these instructions may be stored (and/or executed) remotely and communicated to the client computing over network 1326. In other embodiments, all of these instructions may be stored locally in the client or other standalone computing device, while in still other embodiments, all of these instructions are stored and executed remotely (e.g., in one or more remote servers) and the results communicated to the client computing device. In yet another embodiment, the instructions (processing logic) may be stored on another form of a tangible, non-transitory computer readable medium, such as shown at 1328. For example, reference 1328 may be implemented as an optical (or some other storage technology) disk or other medium, which may constitute a suitable data carrier to load the instructions stored thereon onto one or more computing devices, thereby physically re-configuring the computing device(s) to one or more of the embodiments described and shown herein. In other implementations, reference 1328 may be embodied as an encrypted solid-state drive. Other implementations are possible.

Embodiments of the present inventions are related to the use of computing devices for detecting suspicious URLs in barcodes in received emails or other forms of electronic messages, as shown and described herein. According to one embodiment, the methods, devices and systems described herein may be provided by one or more computing devices in response to processor(s) 1302 executing sequences of instructions, embodying aspects of the computer-implemented methods shown and described herein, contained in memory 1304. Such instructions may be read into memory 1304 from another computer-readable medium, such as data storage device 1307 or another (optical, magnetic, etc.) data carrier, such as shown at 1328 which may store executable code configured to enable the functionality described and shown relative to FIGS. 1-12 and to take actions discussed herein when a suspicious URL is detected in or otherwise referred to in a received email. Execution of the sequences of instructions contained in memory 1304 causes processor(s) 1302 to perform the steps and have the functionality described herein. In alternative embodiments, hard-wired circuitry may be used in place of or in combination with software instructions to implement the described embodiments. Thus, embodiments are not limited to any specific combination of hardware circuitry and software. The computing devices may include one or a plurality of microprocessors working to perform the desired functions. In one embodiment, the instructions executed by the microprocessor or microprocessors are operable to cause the microprocessor(s) to perform the operations described herein to protect recipients of emails from suspicious HTTP or HTTPS URLs. The instructions may be stored in any computer-readable medium. In one embodiment, they may be stored on a non-volatile semiconductor memory external to the microprocessor or integrated with the microprocessor. In another embodiment, the instructions may be stored on a disk or other suitable data carrier and read into a volatile semiconductor memory before execution by the microprocessor.

One embodiment is a computer-implemented method of detecting a Uniform Resource Locator (URL) encoded in a barcode in an email. Such a computer-implemented method may include receiving the email; prior to delivering the received email to an inbox of an intended recipient of the email and providing the received email to a barcode URL detection engine. According to an embodiment, the barcode URL detection engine may parse the email and build a structured representation of the email, extract an image from the structured representation of the email and send the extracted image to a barcode scanner and receiving a result from the barcode scanner. When the result received from the barcode scanner indicates that the extracted image encodes a barcode storing a Hypertext Transfer Protocol (HTTP) or Hypertext Transfer Protocol Secure (HTTPS) URL, the barcode URL detection engine may determine whether the HTTP or HTTPS URL is suspicious. When the HTTP or HTTPS URL is determined to be suspicious, the barcode URL detection engine may perform one or more selected actions to protect the intended recipient of the received email from the suspicious HTTP or HTTPS URL.

According to further embodiments, the image may be extracted from an encoded attachment part of the received email and extracting may include a prior decoding of the encoded attachment part. Extracting may include determining an encoding method of the encoded attachment part from which the image was extracted, based upon an analysis of header fields and header field values of the received email. Determining the encoding method may include determining that the encoding may be one of 7-bit encoding, 8-bit encoding, binary encoding, quoted-printable encoding and base64 encoding and the header fields include at least one of Content-Disposition field, Content-Type field and Content-Transfer-Encoding field. The image may be extracted from an encoded 'text/html' part of received email and extracting may include a prior decoding of the 'text/html' part of received email. The prior decoding of the 'text/html' part results in raw HTML content and the method further may include parsing the raw HTML content using a HTML parser and building a structured representation using the parsed HTML content. The structured representation includes a Document Object Model (DOM) tree structure.

The embodiments of the present computer-implemented method may further include extracting '<img>' HTML elements and a 'src' attribute from the structured representation and analyzing the 'src' attribute. The 'src' attribute may be configured to store the image encoded using a 'data' URL scheme. Alternatively, the 'src' attribute may store the HTTP or HTTPS URL and the method may further include fetching the image over the Internet using the HTTP or HTTPS URL.

According to further embodiments, sending the extracted image to the barcode scanner may be performed via an Application Programming Interface (API). Sending may include sending the extracted image to a barcode scanner that may be deployed locally. Alternatively, sending the extracted image may include sending the extracted image to a barcode scanner that may be deployed remotely and accessed remotely over the Internet. In other implementations, the barcode scanner may be or include a static library or a dynamic library. The barcode scanner may be configured to decode 1D barcodes, 2D barcodes including QR codes and/or other computer—or machine readable codes, all of which are to be included herein within the scope of the term "barcode".

Determining whether the HTTP or HTTPS URL is suspicious may include querying a URL reputation service, the URL reputation service being based on a Domain Name System (DNS) or HTTP/HTTPS. Determining whether the HTTP or HTTPS URL is suspicious may include querying a domain reputation service with the domain of the HTTP or HTTPS URL, the reputation service being based on DNS or HTTP/HTTPS. Alternatively, still, determining whether the HTTP or HTTPS URL is suspicious may include querying a URL scanning service with the HTTP or HTTPS URL, the URL scanning service being based on HTTP/HTTPS.

According to embodiments, performing at least one selected action may include performing more than one selected action in a configurable order. For example, performing at least one selected action may include adding one or more extended headers to the received email, the extended header(s) being configured to indicate that a barcode storing a suspicious HTTP or HTTPS URL has been detected in the received email. Performing at least one selected action may include adding a prefix to a subject of the received email, the added prefix being configured to indicate that a barcode storing a suspicious HTTP or HTTPS URL has been detected in the received email. In another embodiment, performing at least one selected action may include one or more of: moving the received email to a predetermined folder, deleting the received email and adding a label to the received email. Performing at least one selected action may also include adding a banner to the body of the received email. The banner may include a textual and/or visual warning indicating that a barcode storing a suspicious HTTP or HTTPS URL has been detected in the received email. The banner may include the format of the barcode and/or the suspicious HTTP or HTTPS URL.

Performing at least one selected action may include replacing the extracted image with a template image, the template image including a textual and/or visual warning indicating that a barcode storing a suspicious HTTP or HTTPS URL has been detected and removed from the received email. According to another embodiment, performing at least one selected action may include replacing a rectangular area of the extracted image containing the barcode with a template image, the template image including a textual and/or visual warning indicating that a barcode storing a suspicious HTTP or HTTPS URL has been detected and removed from the received email.

Performing at least one selected action may include replacing the extracted image with a rewritten barcode image that stores a rewritten URL. The rewritten barcode image may store a rewritten URL that points to a URL scanning service, that includes the suspicious HTTP or HTTPS URL to be scanned and that may be formatted identically as a format of the barcode of the extracted image. Performing at least one selected action may include replacing the rectangular area of the image containing the barcode with a rewritten barcode image, with the rewritten barcode image storing a rewritten URL that points to a URL scanning service, that includes the suspicious HTTP or HTTPS URL to be scanned and that may be formatted identically as a format of the barcode of the extracted image. Performing at least one selected action may include replacing, in a 'src' attribute of an '<img>' HTML element of the received email, the extracted image storing the HTTP or HTTPS URL with a template image, the template image including a textual and/or visual warning indicating that a barcode storing a suspicious HTTP or HTTPS URL has been detected and removed. Performing at least one selected action may alternatively include replacing, in the 'src' attribute of the '<img>' HTML element of the received email, the extracted HTTP or HTTPS URL with the HTTP or HTTPS URL of a rewritten barcode image. The rewritten barcode image may store a rewritten URL that points to a URL scanning service, that includes the suspicious HTTP or HTTPS URL to be scanned and that may be formatted identically as a format of the barcode of the extracted image.

According to another embodiment, a computing device may comprise at least one processor; at least one data storage device coupled to the at least one processor; a network interface coupled to the at least one processor and configured to connect to a computer network and a plurality of processes spawned by the at least one processor to instantiate and run a barcode URL detection engine configured to detect a Uniform Resource Locator (URL) encoded in a barcode in an email. Such processes may include processing logic for receiving the email and, prior to delivering the received email to an inbox of an intended recipient of the email, providing the received email to the barcode URL detection engine. The barcode URL detection engine, using the processor and the at least one data storage device may parse the email and build a structured representation of the email. An image may then be extracted from the structured representation of the email. Using the network interface, the extracted image may be sent over the computer network to a barcode scanner. A corresponding result may then be received from the barcode scanner over the computer network. When the result received from the barcode scanner indicates that the extracted image contains a barcode storing a Hypertext Transfer Protocol (HTTP) or Hypertext Transfer Protocol Secure (HTTPS) URL, it may be determined whether the HTTP or HTTPS URL is likely suspicious and, when the HTTP or HTTPS URL is determined to be suspicious, at least one selected action may be performed to protect the receiving computer and the intended recipient of the received email from the suspicious HTTP or HTTPS URL.

Portions of the detailed description above describe processes and symbolic representations of operations by computing devices that may include computer components, including a local processing unit, memory storage devices for the local processing unit, display devices, and input devices. Furthermore, such processes and operations may utilize computer components in a heterogeneous distributed computing environment including, for example, remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements. Moreover, the computer-implemented methods disclosed herein improve the functioning of computers by employing technological solutions enabling the detection of barcode URLs in incoming emails and the selective treatment of potentially malicious barcode URLs. Such technology-based computer-implemented methods also improve the processing of barcode (to include QR codes) URL-containing phishing emails at scale, thereby increasing the safety and effectiveness of the email system and the internet at large. In so doing, embodiments improve the functioning of computers and computer systems by decreasing the likelihood of introducing malicious code therein by taking preemptive measures and actions aimed at preventing such suspicious barcode URLs from harming such systems. The computer-implemented methods disclosed herein also improve the functioning and performance of computers by protecting them from being infected by malicious code pointed at by links encoded in barcodes such as QR codes delivered via email or other forms of electronic messages. Such computer-implemented methods are not capable of being effectively carried out using pen and paper and/or by the mental processes of humans.

A process, such as the computer-implemented methods described and shown herein, may generally be defined as being a sequence of computer-executed steps leading to a desired result, meaning the detection and processing of potentially malicious barcode URLs. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering and the like. The operations described herein are machine operations performed in conjunction with various input provided by a human or artificial intelligence agent operator or user that interacts with the computer. The machines used for performing the operations described herein include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose hardware machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

While certain embodiments of the disclosure have been described, these embodiments have been presented by way of example only and are not intended to limit the scope of the disclosure. Indeed, the novel methods, devices and systems described herein may be embodied in a variety of other forms. Furthermore, various omissions, substitutions, and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A computer-implemented method of detecting a Uniform Resource Locator (URL) encoded in a barcode in an email, the computer-implemented method comprising:
   receiving the email;
   prior to delivering the received email to an inbox of an intended recipient of the email, providing the email to a barcode URL detection engine, the barcode URL detection engine:
      parsing the email and building a structured representation of the email,
      extracting an image from the structured representation of the email;
      sending the extracted image to a barcode scanner and receiving a result from the barcode scanner;
      when the result received from the barcode scanner indicates that the extracted image encodes a barcode storing a Hypertext Transfer Protocol (HTTP) or Hypertext Transfer Protocol Secure (HTTPS) URL,
      determining whether the HTTP or HTTPS URL is suspicious and, when the HTTP or HTTPS URL is determined to be suspicious, performing at least one selected action to protect the intended recipient of the received email from the suspicious HTTP or HTTPS URL,
      wherein performing at least one selected action includes replacing a rectangular area of the extracted image containing the barcode with a template image, the template image including a textual and/or visual warning indicating that a barcode storing a suspicious HTTP or HTTPS URL has been detected and removed from the received email.

2. The computer-implemented method of claim 1, wherein the image is extracted from an encoded attachment part of the email and wherein extracting comprises a prior decoding of the encoded attachment part.

3. The computer-implemented method of claim 2, wherein extracting comprises determining an encoding method of the encoded attachment part from which the image was extracted, based upon an analysis of header fields and header field values of the received email.

4. The computer-implemented method of claim 3, wherein determining the encoding method includes determining that the encoding is one of 7-bit encoding, 8-bit encoding, binary encoding, quoted-printable encoding and base64 encoding and wherein the header fields include at least one of 'Content-Disposition' field, 'Content-Type' field and 'Content-Transfer-Encoding' field.

5. The computer-implemented method of claim 1, wherein the image is extracted from an encoded 'text/html' part of received email and wherein extracting comprises a prior decoding of the encoded 'text/html' part of received email.

6. The computer-implemented method of claim 5, wherein the prior decoding of the 'text/html' part results in raw HTML content and wherein the method further comprises:
   parsing the raw HTML content using an HTML parser, and
   building a structured representation using the parsed HTML content.

7. The computer-implemented method of claim 6, wherein the structured representation includes a Document Object Model (DOM) tree structure.

8. The computer-implemented method of claim 6, further comprising extracting '<img>' HTML elements and a 'src' attribute from the structured representation and analyzing the 'src' attribute.

9. The computer-implemented method of claim 8, wherein the 'src' attribute stores one of:
   the image encoded with a 'data' URL scheme, and
   the HTTP or HTTPS URL, and wherein the method further comprises fetching the image over the Internet using the HTTP or HTTPS URL.

10. The computer-implemented method of claim 1, wherein sending the extracted image to the barcode scanner is performed via an Application Programming Interface (API).

11. The computer-implemented method of claim 1, wherein sending comprises one of sending the extracted image to a barcode scanner that is deployed locally and sending the extracted image to a barcode scanner that is deployed remotely and accessed over the Internet.

12. The computer-implemented method of claim 1, wherein the barcode scanner is one of a static library and a dynamic library.

13. The computer-implemented method of claim 1, wherein the barcode scanner is configured to decode 1D barcodes and 2D barcodes including QR codes.

14. The computer-implemented method of claim 1, wherein performing at least one selected action comprises performing more than one selected action in a configurable order.

15. The computer-implemented method of claim 1, wherein determining whether the HTTP or HTTPS URL is suspicious comprises querying a URL reputation service, the URL reputation service being based on one of Domain Name System (DNS) and HTTP/HTTPS.

16. The computer-implemented method of claim 1, wherein determining whether the HTTP or HTTPS URL is suspicious comprises querying a domain reputation service with the domain of the HTTP or HTTPS URL, the reputation service being based on one of DNS and HTTP/HTTPS.

17. The computer-implemented method of claim 1, wherein determining whether the HTTP or HTTPS URL is suspicious comprises querying a URL scanning service with the HTTP or HTTPS URL, the URL scanning service being based on HTTP/HTTPS.

18. The computer-implemented method of claim 1, wherein performing at least one selected action comprises adding at least one extended header to the received email, the at least one extended header being configured to indicate that a barcode storing a suspicious HTTP or HTTPS URL has been detected in the received email.

19. The computer-implemented method of claim 1, wherein performing at least one selected action comprises adding a prefix to a subject of the received email, the added prefix being configured to indicate that a barcode storing a suspicious HTTP or HTTPS URL has been detected in the received email.

20. The computer-implemented method of claim 1, wherein performing at least one selected action comprises at least one of moving the received email to a predetermined folder, deleting the received email and adding a label to the received email.

21. The computer-implemented method of claim 1, wherein performing at least one selected action comprises adding a banner to a body of the received email.

22. The computer-implemented method of claim 21, wherein the banner comprises a textual and/or visual warning indicating that a barcode storing a suspicious HTTP or HTTPS URL has been detected in the received email.

23. The computer-implemented method of claim 21, wherein the banner includes at least one of a format of the barcode and the suspicious HTTP or HTTPS URL.

24. The computer-implemented method of claim 1, wherein performing at least one selected action comprises replacing the extracted image with a template image, the template image including a textual and/or visual warning indicating that a barcode storing a suspicious HTTP or HTTPS URL has been detected and removed from the received email.

25. The computer-implemented method of claim 1, wherein performing at least one selected action comprises replacing the extracted image with a rewritten barcode image that stores a rewritten URL.

26. The computer-implemented method of claim 25, wherein the rewritten barcode image stores a rewritten URL that points to a URL scanning service, that includes the suspicious HTTP or HTTPS URL to be scanned and that is formatted identically as a format of the barcode of the extracted image.

27. The computer-implemented method of claim 1, wherein performing at least one selected action comprises replacing the rectangular area of the image containing the barcode with a rewritten barcode image.

28. The computer-implemented method of claim 1, wherein the rewritten barcode image stores a rewritten URL that points to a URL scanning service, that includes the suspicious HTTP or HTTPS URL to be scanned and that is formatted identically as a format of the barcode of the extracted image.

29. The computer-implemented method of claim 1, wherein performing at least one selected action comprises replacing, in a 'src' attribute of an '<img>' HTML element of the received email, the extracted HTTP or HTTPS URL with the URL of a template image, the template image including a textual and/or visual warning indicating that a barcode storing a suspicious HTTP or HTTPS URL has been detected and removed.

30. The computer-implemented method of claim 1, wherein performing at least one selected action comprises replacing, in the 'src' attribute of the '<img>' HTML element of the received email, the extracted HTTP or HTTPS URL with the URL of a rewritten barcode image.

31. The computer-implemented method of claim 30, wherein the rewritten barcode image stores a rewritten URL that points to a URL scanning service, that includes the suspicious HTTP or HTTPS URL to be scanned and that is formatted identically as a format of the barcode of the extracted image.

32. A computing device comprising:
at least one processor;
at least one data storage device coupled to the at least one processor;
a network interface coupled to the at least one processor and configured to connect to a computer network;
a plurality of processes spawned by the at least one processor to instantiate and run a barcode URL detection engine configured to detect a Uniform Resource Locator (URL) encoded in a barcode in an email, the processes including processing logic for:
receiving the email;
prior to delivering the received email to an inbox of an intended recipient of the email, providing the received email to the barcode URL detection engine, the barcode URL detection engine, using the processor and the at least one data storage device:
parsing the email and building a structured representation of the email,
extracting an image from the structured representation of the email;
using the network interface, sending the extracted image over the computer network to a barcode scanner and receiving a result from the barcode scanner over the computer network;
when the result received from the barcode scanner indicates that the extracted image encodes a barcode storing a Hypertext Transfer Protocol (HTTP) or Hypertext Transfer Protocol Secure (HTTPS) URL, determining whether the HTTP or HTTPS URL is suspicious and, when the HTTP or HTTPS URL is determined to be suspicious, performing at least one selected action to protect the intended recipient of the received email from the suspicious HTTP or HTTPS URL,
wherein performing at least one selected action includes replacing a rectangular area of the extracted image containing the barcode with a template image, the template image including a textual and/or visual warning indicating that a barcode storing a suspicious HTTP or HTTPS URL has been detected and removed from the received email.

33. The computer-implemented method of claim 32, wherein performing at least one selected action comprises replacing the extracted image with a rewritten barcode image that stores a rewritten URL.

34. The computer-implemented method of claim 33, wherein the rewritten barcode image stores a rewritten URL that points to a URL scanning service, that includes the suspicious HTTP or HTTPS URL to be scanned and that is formatted identically as a format of the barcode of the extracted image.

35. The computer-implemented method of claim 32, wherein performing at least one selected action comprises replacing the rectangular area of the image containing the barcode with a rewritten barcode image.

36. The computer-implemented method of claim 35, wherein the rewritten barcode image stores a rewritten URL that points to a URL scanning service, that includes the suspicious HTTP or HTTPS URL to be scanned and that is formatted identically as a format of the barcode of the extracted image.

37. The computer-implemented method of claim 32, wherein performing at least one selected action comprises replacing, in a 'src' attribute of an '<img>' HTML element of the received email, the extracted HTTP or HTTPS URL with the URL of a template image, the template image including a textual and/or visual warning indicating that a barcode storing a suspicious HTTP or HTTPS URL has been detected and removed.

38. The computer-implemented method of claim 37, wherein performing at least one selected action comprises replacing, in the 'src' attribute of the '<img>' HTML element of the received email, the extracted HTTP or HTTPS URL with the URL of a rewritten barcode image.

39. The computer-implemented method of claim 38, wherein the rewritten barcode image stores a rewritten URL that points to a URL scanning service, that includes the suspicious HTTP or HTTPS URL to be scanned and that is formatted identically as a format of the barcode of the extracted image.

40. A computer-implemented method of detecting a Uniform Resource Locator (URL) encoded in a barcode in an email, the computer-implemented method comprising:
 receiving the email;
 prior to delivering the received email to an inbox of an intended recipient of the email, providing the email to a barcode URL detection engine, the barcode URL detection engine:
 parsing the email and building a structured representation of the email,
 extracting an image from the structured representation of the email by prior decoding of an encoded 'text/html' part of received email, resulting in raw HTML content by:
 parsing the raw HTML content using an HTML parser;
 building a structured representation using the parsed HTML content;
 extracting '<img>' HTML elements and a 'src' attribute from the structured representation, and
 analyzing the 'src' attribute;
 sending the extracted image to a barcode scanner and receiving a result from the barcode scanner;
 when the result received from the barcode scanner indicates that the extracted image encodes a barcode storing a Hypertext Transfer Protocol (HTTP) or Hypertext Transfer Protocol Secure (HTTPS) URL,
 determining whether the HTTP or HTTPS URL is suspicious and, when the HTTP or HTTPS URL is determined to be suspicious, performing at least one selected action to protect the intended recipient of the received email from the suspicious HTTP or HTTPS URL.

41. The computer-implemented method of claim 40, wherein the 'src' attribute stores one of:
 the image encoded with a 'data' URL scheme, and
 the HTTP or HTTPS URL, and wherein the method further comprises fetching the image over the Internet using the HTTP or HTTPS URL.

\* \* \* \* \*